Feb. 20, 1962 W. G. LANG 3,022,207
METHOD OF PRODUCING DECORATIVE WALL PANELS
WITH PREFINISHED SCORE LINES
Filed Feb. 8, 1961

INVENTOR
William George Lang
By Stevens, Davis, Miller & Mosher
ATTORNEYS

United States Patent Office 3,022,207
Patented Feb. 20, 1962

3,022,207
METHOD OF PRODUCING DECORATIVE WALL PANELS WITH PREFINISHED SCORE LINES
William George Lang, Toronto, Ontario, Canada, assignor to Abiti Power & Paper Company, Limited, Iroquois Falls, Ontario, Canada
Filed Feb. 8, 1961, Ser. No. 87,795
3 Claims. (Cl. 154—45.9)

This invention relates to a method of producing decorative wall panels with prefinished score lines.

A substantial quantity of hardboard and plywood with simulated woodgrain appearance is being sold as decorative wall panelling. These panels are being produced through lamination of printed papers or plastic films to the underlying panel surface or through off-set printing of the actual panel surface. To further enhance the "wood-like" appearance of these products it has been found desirable to groove or score these panels, before or after processing, to imitate the effect of random planks of wood and to minimize the effect of the joint and nails.

Up to now, this grooving has left much to be desired in that the appearance does not equal that of the flat surface of the board. The appearance given by the grooving is often synthetic. The unsatisfactory appearance is a result of the processes previously used. One method used consists of cutting contoured grooves into the prefinished panel and in this case, the result is unsatisfactory since the core of the underlying material is exposed and since the groove is completely unfinished in contrast to the decorated surface. Attempts have been made to finish this groove line through secondary painting and although good results are sometimes achieved if proper care is taken, this method is undesirable in that a secondary operation is required with added cost. Another process has been used on printed boards and involves pre-scoring of the original board before painting the under-coating and then printing. The result of this method has also been unsatisfactory in that the score line tends to be absorptive and rougher than the flat surface and therefore paints poorly in comparison to this surface. These drawbacks can be overcome by special treatment of the score line before or after printing but this again has the drawback of added cost.

In accordance with this invention, a board panel is formed having score line grooves preformed in a surface thereof. An overlay film is applied to such surface. This overlay film comprises a thermoplastic resin and may be a thermoplastic film or may be paper impregnated with thermoplastic resin. The assembly of the board panel and overlay film is passed through a set of nip rolls, including a heated roll contoured to conform with the score line grooves and a backing roll, to laminate the overlay film to said surface and to slit the film centrally of the score line grooves, leaving edges of the overlay which become secured to the sides of the score line grooves.

In the drawings which illustrate the preferred embodiment of this invention.

Figure 1:
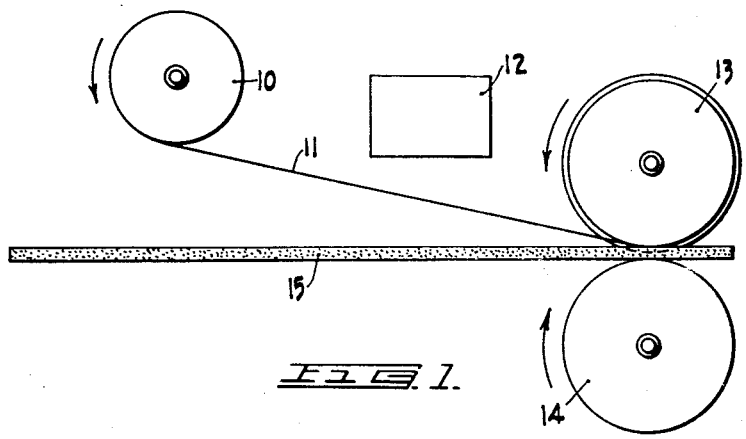
FIGURE 1 is an elevation view showing the application of the overlay film to the board panel.

Referring now to the drawings, FIGURE 1 illustrates a roll 10 of overlay film 11, which is directed past preheater 12 to a set of nip rolls comprising contoured roll 13 and backing roll 14, where it is laminated with scored panel 15.

Figure 2:
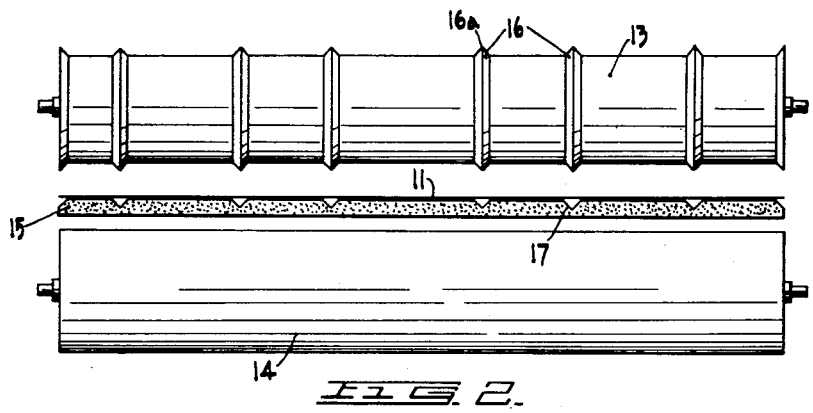
FIGURE 2 is an end view corresponding to FIGURE 1 but showing the metal roll spaced from the overlay film for clarity of illustration.

As will be apparent from FIGURE 2, metal roll 13 has annular ribs 16 shaped to conform with the score line grooves 17 in panel 15. Ribs 16 taper off to a sharp point 16a capable of slitting the impregnated paper or film which has been applied to the board. Roll 13 is heated so as to soften the thermoplastic resin of film 11 laminating the thermoplastic film 11 to the surface of panel 15. The backing roll 14 is preferably a resilient roll.

Figure 3:
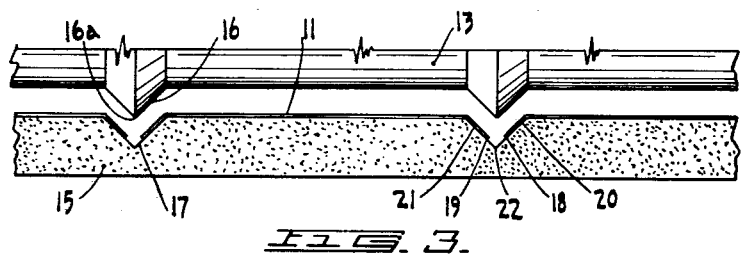
FIGURE 3 is a detailed view similar to FIGURE 2 but showing the metal roll in operative position.

FIGURE 3 illustrates the slitting of film 11 by annular ribs 16. It will be noted that film 11 is slit centrally of grooves 17 to leave edges 18 and 19. Portions 20 and 21 of the film are secured to the sides of groove 17. The board panel is exposed at the bottom of groove 17 between edges 18 and 19, as indicated at 22.

The overlay film can consist entirely of thermoplastic material such as polyvinyl chloride or polyvinyl acetate, polyester, polyvinylidene chloride or polyethylene or alternatively, can be plain or printed paper impregnated with such thermoplastic resin or latex. Where it is desired to print the overlay with wood grain, the thermoplastic film can be printed by means of ordinary offset printing or conventional printing papers can first be printed with wood grain patterns and the paper can then be impregnated with a thermoplastic resin or latex. If desired or necessary, a thermoplastic adhesive can be used with thermoplastic film or even with a non-thermoplastic film such as paper, textiles or metal foil.

The board panel may be hardboard, plywood or similar base material. As prescored board is fed to the rolls, the overlay film is laid down on the board surface. The heat and pressure resulting from roll 13 laminates the overlay to the board. In some cases it has been found beneficial to heat the paper prior to the nip rolls and for this reason preheater 12 may be provided. The board surface may also be preheated. As the paper and board enter the nip, the overlay is slit directly over the center of the underlying groove 17, the thermoplastic resins softens and flows slightly under the heat and pressure and the overlay is then fused not only to the board surface but also to the sides of the groove.

The advantages of this invention are that an effect of realistic depth is provided; the exposure of the core material of the bottom of the groove gives a desirable three-dimensional effect to the score line; the edges 18 and 19 which extend into the groove result in the sides of the groove being surfaced, thereby protecting the edges of the groove from abrasion and giving a finished appearance. There is a saving in cost in that the groove is finished at the same time that the decorative surface is applied thereby saving at least one additional operation.

I claim:

1. A method for making decorative wall panels with prefinished score lines comprising forming a board panel having score line grooves preformed in the surface thereof, applying an overlay layer comprising thermoplastic resin to said surface and passing the assembly of said board panel and overlay layer through a set of nip rolls including a heated roll contoured to conform with said score line grooves and a backing roll to laminate the overlay film to said surface and to slit the film centrally of the score line grooves, leaving edges of the overlay layer which become secured to the sides of said score line grooves.

2. A method as in claim 1 in which said heated roll is contoured to provide annular ribs having a sharp outer edge to slit the overlay.

3. A decorative wall panel comprising a board panel having score line grooves in the surface thereof and an overlay laminated to said surface with the overlay secured to the sides of said grooves and being centrally slit in alignment with the center lines of said grooves to expose the board panel at the bottom of said grooves.

References Cited in the file of this patent

UNITED STATES PATENTS

| | | |
|---|---|---|
| 1,337,254 | Muench | Apr. 20, 1920 |
| 2,018,712 | Eimendorf | Oct. 29, 1935 |